(12) United States Patent
Hawblitzel

(10) Patent No.: US 8,776,032 B2
(45) Date of Patent: Jul. 8, 2014

(54) AUTOMATIC REGION-BASED VERIFICATION OF GARBAGE COLLECTORS

(75) Inventor: Chris Hawblitzel, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1076 days.

(21) Appl. No.: 12/362,444

(22) Filed: Jan. 29, 2009

(65) Prior Publication Data

US 2010/0191928 A1    Jul. 29, 2010

(51) Int. Cl.
*G06F 9/45* (2006.01)
*G06F 9/44* (2006.01)

(52) U.S. Cl.
USPC ............ 717/140; 717/130; 717/146; 717/151

(58) Field of Classification Search
CPC ...................................... G06F 8/41; G06F 8/52
See application file for complete search history.

(56) References Cited

U.S. PATENT DOCUMENTS

| | | | |
|---|---|---|---|
| 5,485,613 A | 1/1996 | Engelstad | |
| 6,925,637 B2 | 8/2005 | Thomas | |
| 7,139,784 B2 | 11/2006 | Knobe | |
| 7,233,733 B2 | 6/2007 | Derby | |
| 7,404,182 B1 * | 7/2008 | Garthwaite et al. | 717/140 |
| 7,506,317 B2 * | 3/2009 | Liang et al. | 717/130 |
| 7,620,943 B1 * | 11/2009 | Garthwaite | 717/140 |
| 7,818,729 B1 | 10/2010 | Plum et al. | |
| 8,104,021 B2 | 1/2012 | Erlingsson et al. | |
| 8,127,280 B2 | 2/2012 | Thomas et al. | |
| 8,132,002 B2 | 3/2012 | Lo et al. | |
| 8,181,021 B2 | 5/2012 | Ginter et al. | |
| 8,375,373 B2 * | 2/2013 | Sollich | 717/146 |
| 2004/0111718 A1 * | 6/2004 | Detlefs | 717/151 |
| 2004/0172638 A1 | 9/2004 | Larus | |
| 2004/0261065 A1 * | 12/2004 | Abrams et al. | 717/140 |
| 2005/0065973 A1 * | 3/2005 | Steensgaard et al. | 707/103 Y |
| 2005/0071387 A1 | 3/2005 | Mitchell | |
| 2005/0114842 A1 | 5/2005 | Fleehart et al. | |
| 2005/0283771 A1 * | 12/2005 | Paller | 717/151 |
| 2006/0085433 A1 | 4/2006 | Bacon | |
| 2006/0265438 A1 * | 11/2006 | Shankar et al. | 707/206 |
| 2006/0277539 A1 | 12/2006 | Amarasinghe et al. | |
| 2007/0174370 A1 | 7/2007 | Detlefs | |
| 2008/0010327 A1 | 1/2008 | Steensgaard | |
| 2008/0148244 A1 | 6/2008 | Tannenbaum et al. | |
| 2009/0222801 A1 * | 9/2009 | Dussud et al. | 717/146 |
| 2009/0307669 A1 * | 12/2009 | Garst et al. | 717/130 |
| 2009/0327374 A1 * | 12/2009 | Wright et al. | 707/206 |

OTHER PUBLICATIONS

Barnett et al., Boogie: A Modular Reusable Verifier for Object-Oriented Programs, 2005, 24 pages, <http://research.microsoft.com/apps/pubs/defaultaspx?id=72858>.*

(Continued)

*Primary Examiner* — Thuy Dao
(74) *Attorney, Agent, or Firm* — Steve Wight; Carole Boelitz; Micky Minhas

(57) ABSTRACT

Systems and methods that add specifications to procedures in a garbage collector for indicating what each procedure does. Such annotations can be added in the source code, to indicate what the source code is to do when it runs—hence enabling an automatic verification of the garbage collector by a verification component. The specification can be presented as a logical formula that can be readily processed by a theorem prover, which is associated with the verification component. Such logical formulas can further employ regions to specify correctness of the garbage collector.

18 Claims, 11 Drawing Sheets

(56) References Cited

OTHER PUBLICATIONS

Andrew E. McCreight, The Mechanized Verification of Garbage Collector Implementations, 2008, 257 pages, <http://flint.cs.yale.edu/flint/publications/mccreight-thesis.pdf>.*

Kung et al., An Efficient Parallel Garbage Collection System and Its Correctness Proof, 1997, 12 pages.*

Montenegro et al., A type system for safe memory management and its proof of correctness, Jul. 2008, 11 pages.*

Grossman et al., Region-based memory management in cyclone, Jun. 2002, 12 pages.*

Hawblitzel et al., Automated verification of practical garbage collectors, Jan. 2009, 13 pages.*

Henning Makholm, Region-based Memory Management in Prolog http://citeseerx.ist.psu.edu/viewdoc/download?doi=10.1.1.35.9646&rep=rep1&type=pdf Last accessed on Nov. 18, 2008, 182 pages.

Pex Now a DevLabs Project http://blogs.msdn.com/nikolait/. Last accessed on Nov. 18, 2008, 14 pages.

Andrew McCreight, et al., A General Framework for Certifying Garbage Collectors and their Mutators http://flint.cs.yale.edu/flint/publications/hgc.pdf. Last accessed on Nov. 18, 2008, 12 pages.

Martin T. Vechev, et al. CGCExplorer: A Semi-Automated Search Procedure for Provably Correct Concurrent Collectors http://www.research.ibm.com/paraglide/papers/pldi07-cgc.ps Last accessed on Nov. 18, 2008, 12 pages.

Daniel C. Wang, et al., Type-Preserving Garbage Collectors http://www.cs.princeton.edu~appel/papers/typegc.pdf Last accessed on Nov. 18, 2008, 13 pages.

Heiser, G., K. Elphinstone, I. Kuz, G. Klein, S. M. Petters, Towards trustworthy computing systems: Taking microkernels to the next level, Operating Systems Review, Jul. 2007, vol. 41, No. 4, pp. 3-11.

Dao, Thuy Chan, Notice of Allowance, U.S. Appl. No. 12/714,468, Aug. 27, 2012.

* cited by examiner

```
function{: expand false} T(i) { true } const NO_ABS: int, memLo : int, memHi : int; axiom 0 <
memLo<=memHi;
fun memAddr(i)  { memLo <= i <memHi }
fun Unalloc(i){ i==0 }fun White(i){i==-1}fun Gray(i){i==-2 }fun Black(i){i==-3}
var Mem: [int,int]int, Color: [int] int;
var $toAbs: [int]int, $AbsMem: [int,int]int;
fun WellFormed($toAbs) {
   (V^Ti1.V^Ti2. memAddr(i1) && memAddr(i2)
      && $toAbs[i1] != NO_ABS
      && $toAbs[i2] != NO_ABS
      && i1 !=i2
   ==> $toAbs [i1] != $toAbs [i2])
}
fun Pointer($toAbs,ptr,$abs) {
   memAddr(ptr) && $abs !=NO_ABS
   && $toAbs[ptr] ==$abs
}
fun ObjInv(i,$toAbs,$AbsMem,Mem) {
   $toAbs[i] != NO_ABS ==>
      Pointer($toAbs, Mem[i,0], $AbsMem[$toAbs[i] ,0]) && Pointer($toAbs, Mem[i, 1], $AbsMem[$toAbs[i] ,
1])
}
fun GcInv(Color, $toAbs, $AbsMem, Mem) { WellFormed($toAbs)
   && (V^Ti. memAddr(i) ==>
      ObjInv(i, $toAbs, $AbsMem, Mem)
      && 0<=Color[i] <4
      && (Black(Color [i]) ==> !White (Color [Mem [i, 0]])    && ($toAbs [i] = NO_ABS <==> Unalloc (Color [i])))
      && !White(Color[Mem[i, 1]]))
}
fun MutatorInv(Color, $toAbs, $AbsMem, Mem) { WellFormed($toAbs)
   && (V^Ti. memAddr(i) ==>
      ObjInv(i, $toAbs, $AbsMem, Mem)
      && 0<=Color[i] <2
   && ($toAbs [i] == NO_ABS <==> Unalloc (Color [i])))
}
```

Fig. 4

```
procedure Initialize()
modifies $toAbs, Color;
ensures MutatorInv(Color, $toAbs, $AbsMem, Mem); ensures WellFormed($toAbs);
{
  var ptr;
  ptr := memLo;
  while (ptr<memHi)
    invariant T(ptr) && memLo<=ptr<=memHi; invariant (V^T i. memLo <= i <ptr ==>
      $toAbs[i] ==NO_ABS && Unalloc(Color[i]));
  {
    Color[ptr] := 0;
    $toAbs[ptr] := NO_ABS;
    ptr := ptr + 1;
  }
} procedure ReadField(ptr, field) returns (val) requires MutatorInv(Color, $toAbs, $AbsMem, Mem); requires Pointer($toAbs, ptr, $toAbs[ptr]); requires
field==0 | | field==1;
ensures Pointer($toAbs, val, $AbsMem [$toAbs [ptr] ,field]);
{
  assert T(ptr);
  val := Mem[ptr,field];
} procedure WriteField(ptr, field, val)
requires MutatorInv(Color, $toAbs, $AbsMem, Mem); requires Pointer($toAbs, ptr, $toAbs[ptr]); requires Pointer($toAbs, val, $toAbs[val]); requires
field==0 | | field==1;
modifies $AbsMem, Mem;
ensures MutatorInv (Color, $toAbs, $AbsMem, Mem); ensures $AbsMem ==
  old($AbsMem) [$toAbs[ptr] ,field := $toAbs[val]];
{
  assert T(ptr) && T(val);
  Mem[ptr,field] := val;
  $AbsMem[$toAbs[ptr] ,field] := $toAbs[val];
}
```

Fig. 6

```
procedure GarbageCollect (root)
  requires MutatorInv(Color, $toAbs, $AbsMem, Mem); requires root != 0 ==>
                   Pointer($toAbs, root, $toAbs [root]); modifies Color, $toAbs;
  ensures MutatorInv (Color, $toAbs, $AbsMem, Mem); ensures root !=0 ==>
                   Pointer($toAbs, root, $toAbs [root]); ensures (V$^T$ i.memAddr(i) && $toAbs[i] !=NO_ABS ==>
                                $toAbs [i] == old($toAbs) [i]);
ensures root !=0 ==>
                   $toAbs [root] == old($toAbs) [root];
{
  assert T(root);
  if (root !=0)  {
      call Mark(root);   }
  call Sweep();
}
procedure Alloc(root, $abs) returns (newRoot,ptr) requires MutatorInv(Color, $toAbs, $AbsMem, Mem); requires root != 0 ==>
            Pointer($toAbs, root, $toAbs [root]); requires $abs !=NO_ABS;
  requires (V$^T$ i. memAddr(i) ==> $toAbs[i] != $abs); requires $AbsMem[$abs,0] ==$abs;
  requires $AbsMem[$abs,1]   ==$abs;
  modifies Color, $toAbs, Mem;
  ensures MutatorInv (Color, $toAbs, $AbsMem, Mem); ensures root !=0 ==>
                Pointer($toAbs , newRoot, old($toAbs) [root]); ensures Pointer($toAbs, ptr, $abs);
  ensures WellFormed($toAbs);
{
while (true)
   invariant MutatorInv (Color, $toAbs, $AbsMem, Mem); invariant root != 0 ==>
      Pointer ($toAbs, root, $toAbs [root]);
   invariant (V$^T$ i. memAddr(i) ==> $toAbs[i] != $abs); invariant root != 0 ==>
      $toAbs[root] == old($toAbs) [root];
  {
    ptr := memLo;
    while (ptr<memHi)
       invariant T(ptr) && memLo<=ptr<=memHi;
    {
     if (Unalloc(Color[ptr]))  {
      Color[ptr] := 1; // make white
      $toAbs[ptr] := $abs;
      Mem[ptr,0] := ptr;
      Mem[ptr,1] := ptr;
      newRoot := root;
      return;
     }
    ptr := ptr + 1;
   }
   call GarbageCollect(root);
  }
}
```

Fig. 7

```
procedure Mark(ptr)
  requires GcInv(Color, $toAbs, $AbsMem, Mem); requires memAddr(ptr) && T(ptr);
  requires $toAbs[ptr] !=NO_ABS; modifies Color;
  ensures GcInv (Color, $toAbs, $AbsMem, Mem);
  ensures (V⊤i. !Black (Color [i]) ==>
              Color[i] == old (Color) [i]); ensures !White(Color[ptr]);
{
  if (White(Color[ptr]))  { Color[ptr] := 2; // make gray
    call Mark(Mem[ptr,0]); call Mark(Mem[ptr,1]); Color[ptr] := 3; // make black
  }
}
procedure Sweep()
  requires GcInv(Color, $toAbs, $AbsMem, Mem); requires (V⊤i. memAddr(i) ==> !Gray(Color[i])); modifies Color, $toAbs;
  ensures MutatorInv (Color, $toAbs, $AbsMem, Mem); ensures (V⊤ i. memAddr(i) ==>
      (Black(old (Color) [i]) ==> $toAbs [i] != NO_ABS) && ($toAbs[i] !=NO_ABS ==>
          $toAbs[i] ==old($toAbs)[i]));
{
  var ptr;
  ptr := memLo;
  while (ptr<memHi)
    invariant T(ptr) && memLo<=ptr<=memHi; invariant WellFormed($toAbs); invariant (V⊤ i. memAddr(i) ==>
        0<=Color[i] <4
    && !Gray(Color[i])
    && (Black(old(Color)[i]) ==> $toAbs[i] !=NO_ABS
          && ObjInv(i, $toAbs, $AbsMem, Mem)
          && (Mem[i,0] >=ptr ==> !White(Color[Mem[i,0]]))
          && (Mem[i,1] >=ptr ==> !White(Color[Mem[i,1]])))
    && ($toAbs [i] == NO_ABS <==> Unalloc (Color [i])) && ($toAbs[i] !=NO_ABS ==>
          $toAbs [i] == old($toAbs) [i])
    && (ptr <= i ==> Color[i] == old(Color)[i])
    && (i<ptr==>0<=Color[i] <2)
    && (i<ptr && White(Color[i]) ==>
          Black (old(Color) [i])));
  {
  if (White(Color[ptr]))  { Color[ptr] := 0; // deallocate $toAbs[ptr] := NO_ABS;
  }
  else if (Black(Color[ptr]))  { Color[ptr] := 1; // make white }
    ptr := ptr + 1;
  }
}
```

Fig. 8

AUTOMATIC REGION-BASED VERIFICATION OF GARBAGE COLLECTORS

BACKGROUND

Memory available for task execution is an important resource in computer systems. Typically, considerable time and energy is directed for efficiently employing such memory when running applications. An important aspect of such memory management includes how memory is being allocated to a task, or deallocated and then reclaimed for use by other tasks. In general, the process that dynamically manages memory is referred to as the memory manager, wherein the memory that such memory manager manages is referred to as the heap. When a program needs a block of memory to store data, a resource sends a request to the memory manager for memory allocation. Subsequently, the memory manager allocates a block of memory in its heap to satisfy such request, and sends a reference (e.g., a pointer) for the block of memory to the program. The program can then access such block of memory via the reference.

As such, memory allocation/deallocation techniques have become critical in structured programming and object oriented programming languages. Memory allocated from a heap can be employed to store information, wherein such information can be an instantiated object within an objected oriented paradigm. Many programming languages have placed responsibility for dynamic allocations/deallocation of memory on the programmer. Such programming language types are referred to as unmanaged or unsafe programming languages, because pointers can be employed anywhere in an object or routine. In C, C++ and the Pascal programming languages, memory is allocated from the heap by a call procedure, which passes a pointer to the allocated memory back to the call procedure. A call to free the memory is then available to deallocate the memory.

However, if a program overwrites a pointer, then the corresponding heap segment becomes inaccessible to the program. An allocated heap segment can be pointed to by several pointers, located on the stack or in another allocated heap segment. When all the pointers become overwritten, the heap segment becomes inaccessible. A program cannot retrieve from or write data to an inaccessible heap segment. These inaccessible heap segments are known as memory leaks.

Furthermore, dynamically allocated storage may become unreachable if no reference, or pointer to the storage remains in the set of root reference locations for a given computation. The "root set" is a set of node references such that the referenced node must be retained regardless of the state of the heap. A node is a memory segment allocated from the heap. Nodes are accessed through pointers. A node is reachable if the node is in the root set or referenced by a reachable node. Similarly, storage associated with a memory object can be deallocated while still referenced. In this case, a dangling reference has been created. In most programming languages, heap allocations is required for data structures that survive the procedure that created them. If these data structures are passed to further procedures or functions, it may be difficult or impossible for the programmer or compiler to determine the point at which it is safe to deallocate them. Memory objects that are no longer reachable, but have not been freed are called garbage.

The automatic identification and reclaiming of inaccessible heap segments is known as garbage collection. Garbage collection methodologies determine when a memory segment is no longer reachable by an executing program either directly or through a chain of pointers. When a memory segment is no longer reachable, the memory segment can be reclaimed and reused even if it has not been explicitly deallocated by the program. Garbage collection is particularly attractive to managed or functional languages (e.g., JAVA, Prolog, Lisp Smalltalk, Scheme). For example, the JAVA programming language has the characteristic that pointers can only be provided to reference objects (e.g., the head of an object). Thus, the garbage collection methodologies only need to identify object pointers during automatic reclamation of unreachable memory.

Put differently, garbage collectors automatically reclaim dynamically allocated objects that will not be accessed again by the program. As such, garbage collection is widely acknowledged for supporting fast development of reliable and secure software. It has been incorporated into modern languages, such as Java and C#. Nonetheless, garbage collectors are notoriously hard to verify, due to their low-level interaction with the underlying system and the general difficulty in reasoning about reachability in graphs associated therewith. Such verification can reduce the trusted computing base of a system and increase the system's reliability. For example, the verification can be important for secure systems based on proof-carrying code (PCC) or typed assembly language (TAL); typical large-scale PCC/TAL systems can verify the safety of the mutator (the program), but not of the run-time system that manages memory and other resource on the mutator's behalf. Such prevents untrusted programs from customizing the run-time system. Furthermore, bugs in the unverified run-time systems can result in security vulnerabilities that undermine the guarantees promised by PCC and TAL.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The subject innovation adds specifications to procedures in a garbage collector for indicating what each procedure does (e.g., annotations added in the source code, to indicate what the source code is to do when it runs)—hence enabling an automatic verification of the garbage collector by a verification component. Such specification can be presented as a logical formula(s) that can be readily processed by a theorem prover, which is associated with the verification component. Accordingly, what occurs in the garbage collector can be presented in a stylized manner, to facilitate an automatic recognition thereof. Such can further improve reliability and security of the garbage collector.

In a related aspect, the verification component can base the verification strategy for the garbage collector on regions (which describe objects allocated in the memory), and further encode the regions by employing first order logic. Such encoding enables the verification component to use a standard first-order logic theorem prover, and automatically prove the correctness of garbage collectors that have been annotated with preconditions, post conditions, or invariants. Accordingly, such preconditions, post conditions, invariants and the like can be written in a way that requires much less effort to prove—as compared to conventional approaches for verifying garbage collector correctness. Moreover, the verification component can prove statically (e.g., before the program is running) that the garbage collector has predetermined properties, such as if memory controlled by the garbage collector corresponds to objects that the program allocates.

As such, an automatic program verifier is supplied for the garbage collector, which analyzes annotations in the source code. As explained earlier, the garbage collector includes annotations in the source code to indicate a specification for behavior thereof (e.g., what the source code is to do when it runs.)

Moreover, the specification indicates for every concrete object that the garbage collector controls, there exists a corresponding abstract object that the mutator allocated—wherein the concrete object corresponds to the abstract object. Hence, the subject innovation can maintain track of both the original memory and the new memory by employing variables in form of regions.

In a related methodology, initially annotations can be added in the source code to indicate what the source code is to do when it runs. Subsequently, the program verifier can read the source code from the garbage collector. For each procedure, it will look at the specification of that procedure in addition to the logical formula associated therewith. A verification condition can then be computed, which represents a logical formula that if found to be validated indicates that the procedure obeys the specification. Put differently, the source code can be read from the procedure and a verification condition can then be generated therefrom. Subsequently, the verification condition can then be proved and hence the associated procedure verified. Similarly, once all the procedures are verified then the garbage collector is also verified. According to a further methodology, the mutator is first being run. At this point, if the garbage collector is verified for proper operation. Subsequently, the mutator can ask the garbage collector to allocate objects. The garbage collector can then decide to garbage collect memory.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

BRIEF DESCRIPTION OF THE DRAWINGS

FIG. 4 describes particular definitions for a miniature collector according to a further aspect of the subject innovation.

FIG. 6 describes various operations associated with a miniature collector according to a particular aspect.

FIG. 7 describes garbage collection and allocation according to a particular aspect of the subject innovation.

FIG. 8 describes additional features associated with a miniature collector according to a further aspect.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
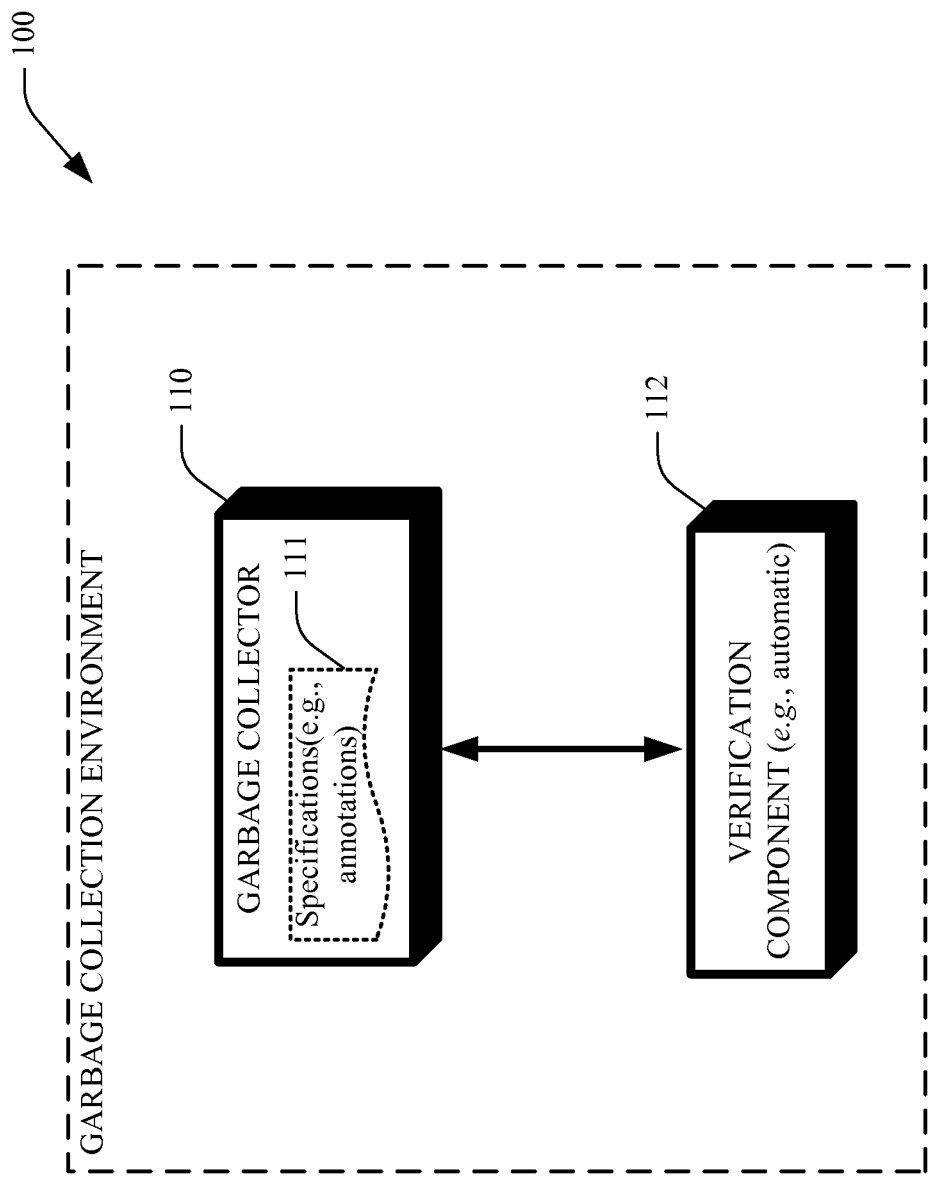
FIG. 1 illustrates a block diagram of a garbage collector with specifications added thereto in accordance with an aspect of the subject innovation.

FIG. 1 illustrates a block diagram of a verification component 112 that can automatically verify the garbage collector 110, via the specification 111 in accordance with an aspect of the subject innovation. The specification 111 can represent annotations added in the source code and indicate what the source code is to do when it runs. Such enables an automatic verification of the garbage collector 110 by the automatic verification component 112. The specification 111 can be presented as a logical formula that can be readily processed by a theorem prover, which is associated with the automatic verification component 112. Accordingly, what occurs in the garbage collector 110 can be presented in a stylized manner, to facilitate an automatic recognition thereof. Such can further improve reliability and security of the garbage collector.

In general, the garbage collector 110 can supply in memory representation of the objects that the program allocates, and further garbage collects objects that the program no longer needs. Moreover, the specification 111 can express high level intuitions as formal logical formulas, and hence the behavior of the source code can be readily provided (e.g., what the source code is to do when it runs.) As such, for every concrete object in memory that the garbage collector controls, a corresponding abstract object in the program that the garbage collector is collecting. The garbage collector 110 runs with a program (e.g., a mutator), which is a program written in managed code that can allocate objects and modifies such objects. Put differently, the mutator is a managed program that allocates and uses memory.

Figure 2:
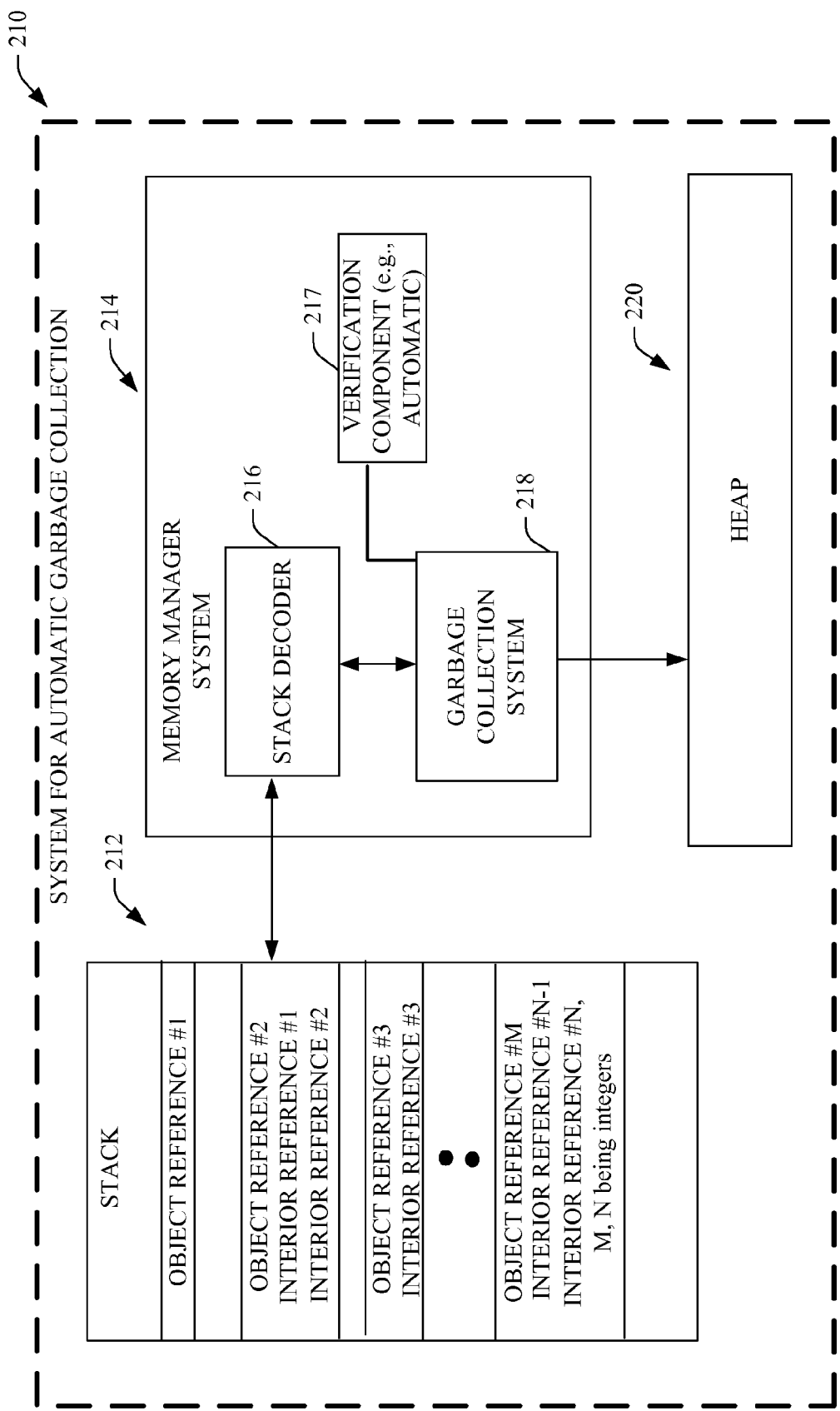
FIG. 2 illustrates an automatic verification of a garbage collector according to a further aspect of the subject innovation.

FIG. 2 illustrates a further example of a system 210 for automatic garbage collection according to an aspect of the subject innovation, which includes a process stack 212, a memory manager system 214 and a memory heap 216. During execution of one or more programs or processes on a machine, status information about executing programs are stored on the process stack 212, so that subroutines or methods/procedures, can call other subroutines. In such environments, managed code is code that manipulates objects that were allocated in the heap. Managed code is required to have a mechanism for enumerating all the live garbage collector pointers currently in use.

When one subroutine/procedure calls another subroutine/procedure status information about the calling subroutine/procedure can be stored on the stack 212, so that such calling subroutine can resume its processing after the called subroutine returns control of the processor to the calling subroutine/program. The status information also includes processor register values of the process at the time the process relinquished control of the processor, object and variable declaration and calls and intermediate computational quantities, such as object references and interior references to the objects referenced As illustrated in FIG. 2, the stack 212 includes, amongst other items, a number object references (e.g., pointers) that reference the location of a corresponding object in the memory heap 216. The objects can be grouped into frames (not shown). Each frame corresponds to one level of subroutine invocation or method invocation. The stack 212 also includes a number of interior references (e.g., pointers) that reference the location of data members (e.g., integer numbers, floating values, character fields, other objects) within the various objects. Since any number of programs can call the same objects and/or object data members, multiple references or interior references to an object can reside in the process stack 212. The object reference can also be located in another heap segment of the memory heap 220. The interior reference locations can be limited to residing on the stack.

Moreover, a memory manager 214 dynamically manages the memory heap 220. When a program needs a segment of memory to store data, the program sends a request to the memory manager 214. The memory manager 214 allocates an object in the heap 220 to satisfy the request. The memory manager 214 then sends a reference to the object to the program. The program can then access the object through the reference. The memory manager 214 includes a stack decoder 216 and a garbage collection system 218. The memory manager 214 can invoke or receive an invocation to perform a garbage collection algorithm. Alternatively, the invocation can be a result of a request for memory by a program. The memory manager 214 can then invoke the stack decoder 216, which will scan the stack 212 for the roots on the stack (e.g., object references and interior references). The stack decoder 216 then transmits the roots (e.g., object references and interior references) to the garbage collection system 218. The garbage collection system 210 can subsequently trace through the memory heap 220 to determine accessible objects using the object references and interior references.

Although the stack decoder 216 is illustrated as a separate component from the garbage collection system 218 within the memory manager system 214, it is to be appreciated that the stack decoder 216 can be integrated into the garbage collections system 218. Additionally, the stack decoder 216 can be a separate component outside the memory manager system 214. The main function of the stack decoder component 216 is to identify the roots within the stack 212 (e.g., object references and/or interior references) and provide those roots to the garbage collection system 218, so that the garbage collection system 218 can perform a clean up of the memory heap 220. The automatic verification component 217

Moreover the verification component 217 can base the verification strategy for the garbage collector 218 based on regions (which describe objects allocated in the memory), and further encode the regions by employing first order logic. Such encoding enables the verification component using a standard first-order logic theorem prover to automatically prove the correctness of garbage collectors that have been annotated with preconditions, postconditions, and invariants. Accordingly, preconditions, post conditions, invariants and the like can be written in a way that requires much less effort to prove—as compared to conventional approaches for verifying garbage collector correctness. In addition, the verification component can prove statically (e.g., before the program is running) that the garbage collector has predetermined properties, such as the memory controlled by the garbage collector corresponds to objects that the program allocates.

Figure 3:
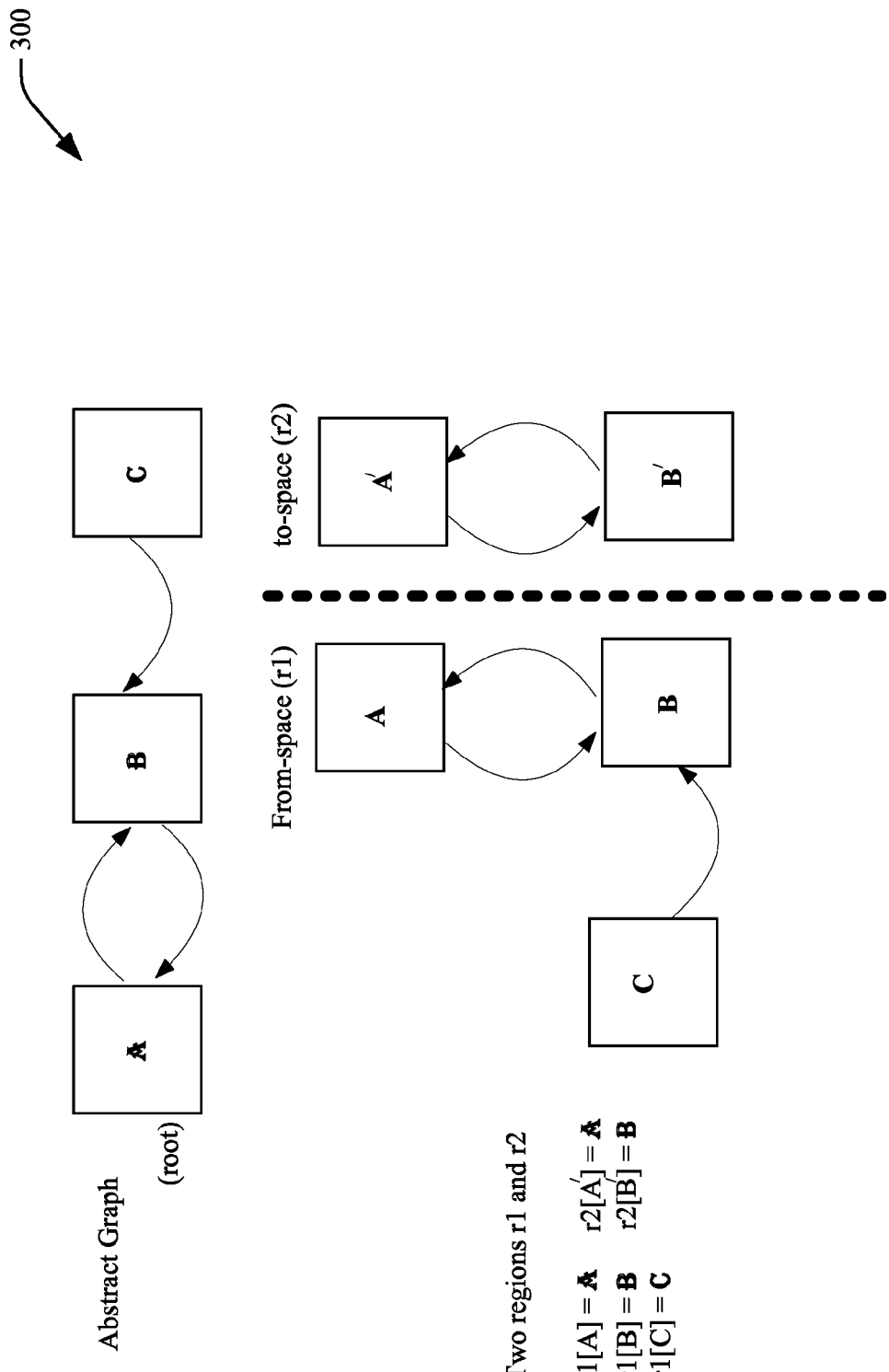
FIG. 3 illustrates an exemplary graph for regions implemented as part of various aspects of the subject innovation.

As described in further detail with regard to FIG. 3, every program or application executing on the system for automatic garbage collection has a set of roots. In general, roots identify storage locations, which refer to objects on the managed heap. All of the global and static object pointers in a program are considered part of the program's roots. In addition, any local variable/parameter object pointers on a thread's stack are considered part of the program's roots. Furthermore, any CPU registers containing pointers to objects in the managed heap are also considered part of the program's roots. In one particular aspect, FIG. 3 illustrates a graph for regions implemented as part of the subject innovation. As illustrated, root A can serve as the root object wherein a pointer is shown from A to B and vice versa. There exists no pointer from A to C and no pointer from B to C; and hence a mutator program associated with the garbage collector cannot reach C starting from root node A, and thus C can be safely deallocated by the garbage collector. Upon deallocation of C, the resulting memory can still meet the specification. As illustrated, concrete objects A' and B' can correspond to abstract object A and abstract object B; respectively. Hence, the shape of the objects A' and B' remains the same where A' points to B' and vice versa, similar to A pointing to B—and vice versa. Accordingly, annotations on the source code specify this property that the concrete graph of objects corresponds to the abstract graph of objects by employing first logic order of formulas.

When the garbage collector produces a new version of memory, which has A', B'—from the original memory that had A, B, and C; the subject innovation can maintain track of both the original memory and the new memory by employing variables in form of regions such as r1 and r2. Accordingly, r1 can indicate that in the original memory A corresponds to A and B corresponds to B and C corresponds to C. Likewise, r2 indicates that in the new version of memory A' corresponds to A and B' corresponds to B. Such enables expressing verification formulas in terms of r1 and r2, to enable automatic verification by the verification component.

According to one particular aspect and as described in detail infra, the Boogie verification generator and the Z3 automated theorem prover can be exploited to verify this assembly language code mechanically—via expression of garbage collector specifications and invariants in a style that allows efficient, automated verification.

BoogiePL is a simple imperative programming language designed to support automated program verification. Such can further include pure (side-effect free) expressions, written in a standard C/C#/Java syntax, imperative statements (which can update local variables and global variables), pure functions, and imperative procedures. Procedures support preconditions and post conditions, written with the keywords requires and ensures, that specify what must be true upon entry to the procedure and what the procedure guarantees is true upon exit from the procedure. Within a procedure, loop invariants for while loops are written with the invariant keyword.

The following example illustrates a pure function Pos, which returns true if its argument is positive, and a procedure IncreaseX that adds a positive number y to a global variable x:

```
function{: expand true} Pos(i : int)returns(bool){i>0} var x: int;
procedure IncreaseX (y : int)
  requires Pos(y);
  modifies x;
  ensures x > old(x);
{
  x : = x + y;
}
```

In this example, the expression old(x) refers to the value of x at the beginning of the procedure's execution, so that the post-condition "ensures x>old(x);" indicates that x will have a larger value upon exit from the procedure than upon entry to the procedure. A procedure discloses all the global variables it modifies (just x in this example); such allows callers of the procedure to know which variables remain unmodified by the procedure. The expand true annotation turns a function definition into a macro that is expanded to its definition whenever it is used, so that "requires Pos(y);" is just an abbreviation for "requires y>0;". (Recursive or mutually recursive macro definitions are disallowed.)

The programs occasionally use the statement "assert P;" which asks the verifier to prove P, which is then used as a lemma for subsequent proving. (The statement "assume P;" is not employed, which can introduce a new lemma P without proof, since this can make our verification unsound.)

The Boogie tool generates verification conditions from the BoogiePL code. These verification conditions are logical formulas that, if valid, guarantee that each procedure call satisfies the procedure's precondition, each procedure guarantees its postcondition, and each loop invariant holds on entry to the loop and is maintained by each loop iteration. Boogie passes these verification conditions to an automated theorem prover, which attempts to prove the validity of the verification conditions. One aspect employs the Z3 theorem prover, which is efficient, scales to large formulas, and reasons about many useful first-order logic theories, including integers, bit vectors, arrays, and uninterpreted functions.

BoogiePL's data types are more purely mathematical than the data types in conventional programming languages. The type int represents mathematical integers, ranging from negative infinity to positive infinity, while bv32 represents 32-bit values. The theorem prover support for int is more mature and efficient than for bv32, so one can employ int wherever possible.

BoogiePL also supports array types [int] t for any element type t, defining arrays as simple mappings from mathematical integers to elements. The BoogiePL "select" expression a [i] retrieves element i from array a, where i can be any integer. The BoogiePL "update" expression a [i:=v] generates a new array, equal to a except at element i, where the new array contains the value v, so that (a[i:=v])[i]=v is true for any a, i and v. For convenience, the statement "a [i]:=v;" is an abbreviation for "a:=(a[i:=v]);". Arrays can also be multidimensional: an array a of type [int, int] t supports a select expression a [i1, i2] and an update expression a [i1, i2:=v]. It is to be appreciated that BoogiePL arrays lack many properties such as, Java arrays. For example, BoogiePL arrays are not references, so there typically is no issue of aliasing: the statement "a:=b;" assigns a copy of array b to variable a.

A Miniature Collector in BoogiePL

The discussion below presents a miniature allocator and mark-sweep collector written in the BoogiePL programming language, introducing some of the invariants used by the more realistic collectors, as described in detail infra.

The allocator and collector are implemented as a single BoogiePL file, shown in its entirety in FIGS. 4-8. When run on this example garbage collector, Boogie verifies all procedures in the collector in less than 2 seconds; since Boogie and Z3 process BoogiePL files entirely automatically, no human assistance or proof scripts are required.

The miniature collector assumes that every object has exactly two fields, numbered 0 and 1, and each field holds a non-null pointer to some object. The collector manages memory addresses in the range memLo ... memHi−1, where memLo and memHi are constants such that 0<memLo<=memHi−1, but whose values are otherwise unspecified (see FIG. 4). Memory is object addressed, rather than byte addressed or word addressed, so that each memory location in the range memLo ... memHi−1 contains either an entire object, or free space big enough to allocate an object in. The variable Mem, of type [int, int] int, represents all of memory; for each address i in the range memLo ... memHi−1 and field field in the range 0 . . . 1, the value Mem[i, field] holds the contents of the field field in the object at address i.

The allocator and collector use a variable Color to represent the state of memory at each address. If Color[i] is 0, the memory at address i is free. Otherwise, the memory is occupied by an object and is either colored white (Color[i]==1), gray (Color[i]==2), or black (Color[i]==3).

Concrete and Abstract States

To verify a garbage collector, one must specify what it means for a collector to be correct. For the mark-sweep collector, a criterion is that it frees all objects unreachable from the root and leaves all reachable objects unmodified. However, such definition of correctness is specific to one particular class of collectors; it does not account for collectors that move objects, and does not account for mutator-collector interaction, such as write barriers and read barriers. In one aspect, one definition of correctness that encompasses many classes of collectors, so one can follow a more general approach, wherein the mutator defines an abstract state, consisting of an abstract graph of abstract nodes. A memory manager is responsible for representing the abstract state in memory. The memory manager exposes procedures to initialize memory, allocate memory, read memory, and write memory (see FIGS. 6, 7). Correctness represents that each of these procedures faithfully represent the abstract state.

To make this notion of correctness precise, the variable $AbsMem of type [int, int] int defines the abstract state as a mapping from abstract nodes and fields to abstract values. In the miniature memory model presented so far, each field contains a pointer to a node, so the abstract values stored in the abstract graph are always abstract nodes.

Figure 5:
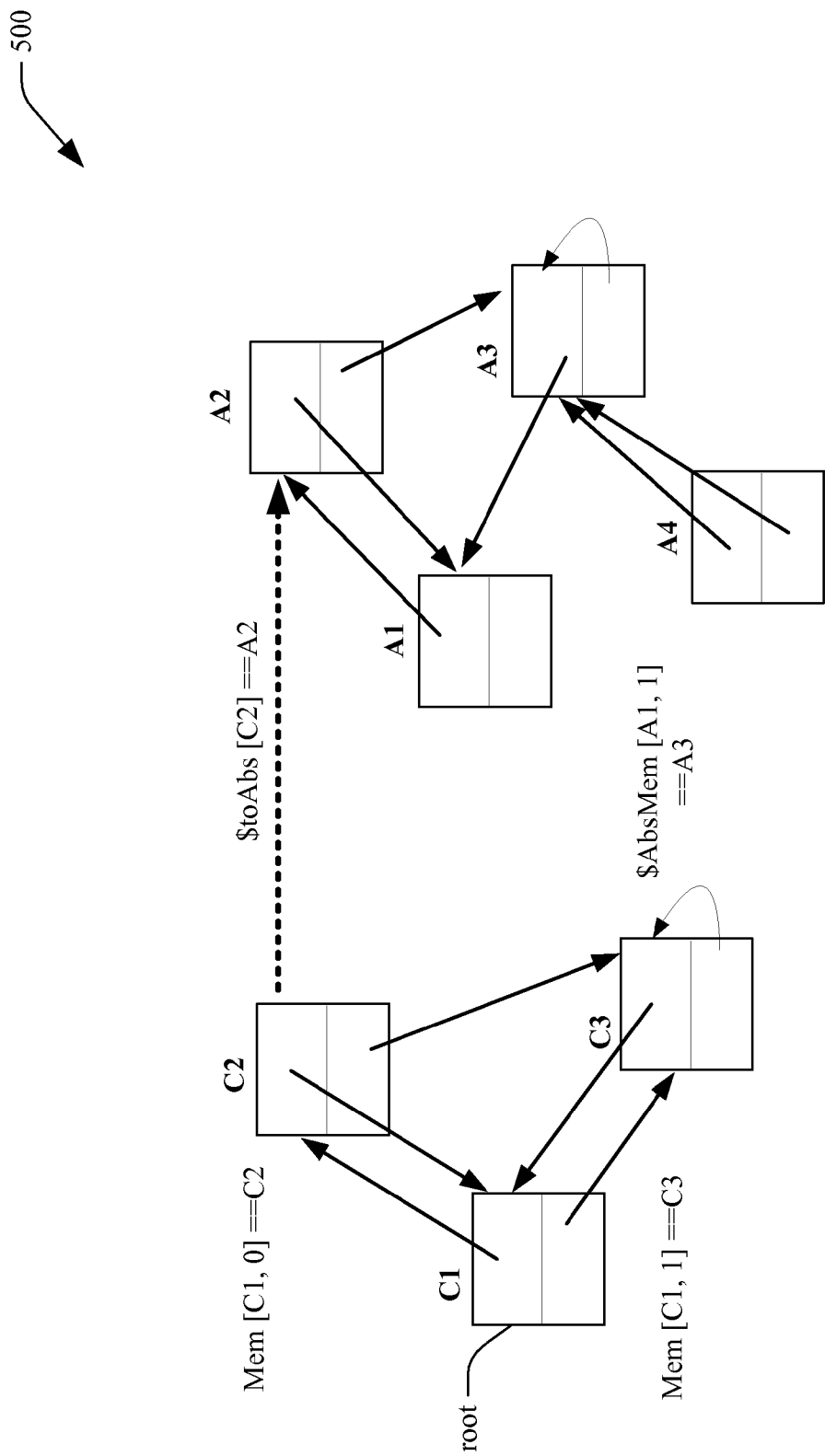
FIG. 5 illustrates concrete and abstract graphs implemented according to a particular aspect of the subject innovation.

For example, FIG. 5 shows an abstract graph consisting of 4 nodes, A1, A2, A3, and A4, each having two fields numbered 0 (on top) and 1 (on the bottom). In this example, A1's bottom field points to A3, so $AbsMem [A1, 1]==A3. Integers represent abstract nodes, but these integers can be any mathematical integers, and need not be related to the addresses used by the computer's actual memory. In fact, the variable $AbsMem is not represented at run-time at all; it is used solely for verification. One can refer to such variables "ghost variables" (also known as "auxillary variables"), and one can employ a naming convention that prefixes each ghost variable with a dollar sign.

The function MutatorInv ( . . . ) defines the invariant that holds on the memory manager's data while the mutator is running. Initialize establishes MutatorInv, while Alloc, ReadField, and WriteField require MutatorInv as a precondition and guarantee MutatorInv as a postcondition. Each collector defines MutatorInv(var1 . . . varn) as it wishes. The mutator is not allowed to modify any of the variables var1 . . . varn directly, but instead typically employs ReadField, WriteField, and Alloc to affect these variables. Since MutatorInv varies across collectors, a mutator that desires to work with all collectors should treat MutatorInv as abstract. In such framework, the specifications for Initialize, Alloc, ReadField, and WriteField are typically the same across all collectors, except for the differing definitions of MutatorInv.

The function $toAbs:[int] int maps each concrete memory address in the range memLo ... memHi−1 to an abstract node, or to NO_ABS. The memory management procedures ensure that $toAbs is well formed (WellFormed($toAbs)), which indicates that any two distinct concrete addresses i1 and i2 map to distinct abstract nodes, unless they map to NO_ABS. In FIG. 5, $toAbs maps addresses C1, C2, and C3 to abstract nodes A1, A2, and A3, respectively, while all other concrete addresses map to NO_ABS. The function Pointer($toAbs,ptr, $abs) says that $toAbs maps the concrete address ptr to the abstract node $ abs.

Suppose the mutator calls ReadField(C1,0), which will return the contents of field 0 of the object at address C1. The preconditionPointer($toAbs,ptr,$toAbs[ptr]) requires C1 to be a valid pointer, mapped to some abstract node (A1 in this example). In the miniature memory model presented so far, all fields hold pointers, so the return value will also be a pointer; the postcondition for ReadField ensures that the returned value is the pointer corresponding to the abstract node $AbsMem [$toAbs [ptr],field]=$AbsMem [A1,0]=A2. Since only one pointer, C2, maps to A2, the postcondition forces ReadField(C1,0) to return exactly the address C2. (The well-formedness condition, WellFormed($toAbs) ensures that no node other than C2 maps to A2.) Once the mutator obtains the pointer C2 from ReadField(C1,0), it can call, for example, ReadField(C2,1) to obtain the pointer C3. Accordingly, the specification of ReadField allows the mutator to traverse the reachable portion of memory, even though the specification never mentions reachability directly.

The specification does not obligate the memory manager to retain unreachable objects. Since A1, A2, and A3 do not point to A4, the memory manager need not devote any physical memory for representing A4. In FIG. 5, there is no concrete address that maps to A4. (It is noted that in one aspect of practical verified collectors, the mutator does not make actual run-time procedure calls to ReadField and WriteField; instead, the postconditions of ReadField and WriteField prove the properties that the mutator needs to read or write memory, without actually reading or writing the memory. For example, ReadField ensures that Pointer($toAbs,Mem[ptr, field], . . . .)

The mutator allocates new abstract nodes by calling Alloc, passing in a fresh abstract node $abs whose fields initially point to itself. Unlike ReadField and WriteField, Alloc modifies $toAbs, which potentially invalidates any pointers that the mutator possesses. (The mutator cannot employ an invalid pointer that refers to an old version of $toAbs, because Pointer($toAbs, . . . ) for an old $toAbs will not satisfy the preconditions for ReadField and WriteField, which are in terms of the current $toAbs.) Therefore, the mutator can pass in a root pointer, and the Alloc procedure returns a new root pointer that points to the same abstract node as the old pointer. One can also allow ReadField and WriteField to modify $toAbs, in which case these procedures would also require a root to be passed in.

Verifying Collection Effectiveness

The specification described above typically hides the garbage collection process behind the Initialize, ReadField, WriteField, and Alloc interfaces. One can also verify one internal property of the garbage collector, invisible to the mutator: after a collection, only abstract nodes that the collector reached have physical memory dedicated to them; unreached abstract nodes are not represented in memory. It is relatively easy to define an axiom for reachability for any particular abstract graph: for any node A, if A is reachable, then A's children are also reachable. Comparatively, it can be difficult to track reachability as the edges in a graph evolve. For the two collectors presented here, the $AbsMem graph remains unmodified throughout collection, but in general, this is not true: incremental collectors interleave short spans of garbage collection with short spans of mutator activity, and the mutator activity modifies $AbsMem. Therefore, one can adopt a looser criterion: rather than checking that all remaining allocated nodes at the end of a collection are reachable from the root, one merely can check that all remaining allocated nodes were reached from the root at some time since the start of the collection. Verifying this property is typically only a relatively small extension to the rest of the verification.

Allocation, Marking, and Sweeping

The Alloc procedure of FIG. 7 performs a linear search for a free memory address; if no free space remains, Alloc calls the garbage collector. The collector recursively marks all nodes reachable from some root pointer (the "mark phase"), and then deallocates all unmarked objects (the "sweep phase"). Likewise, FIG. 8 shows the code for both the Mark and Sweep procedures. The following paragraphs trace the preconditions and postconditions for Mark and Sweep backwards, starting with Sweep's postconditions.

A key property of Sweep is that it leaves no dangling pointers (pointers from allocated objects to free space). This property is part of MutatorInv: each memory address i satisfies ObjInv(i, . . . ), which ensures that if some object lives at i (if $toAbs [i]=NO_ABS), then the object's fields contain valid pointers to allocated objects (see FIG. 7). Specifically, the fields Mem [i,0] and Mem [i,1] are, like i, mapped to some abstract nodes, so that $toAbs [Mem [i,0]]=NO_ABS and $toAbs[Mem[i,1]]=NO_ABS. To maintain such property, Sweep must typically ensure that any object it deallocates had no pointers from objects that remain allocated. Since Sweep deallocates white objects and leaves gray and black objects allocated, Sweep's preconditions requires that no gray-to-white or black-to-white pointers exist.

To rule out gray-to-white pointers, Sweep's second precondition requires that no gray objects exist at all:

requires ($\forall^T i$.memAddr($i$)==>!Gray(Color[$i$]));

The GcInv function (see FIG. 4) prohibits black-to-white pointers: every black object has fields pointing to non-white objects. (This is known as the tri-color or three color invariant.) The Mark procedure's postconditions must typically satisfy Sweep's preconditions. To ensure that no gray objects exist at the end of the mark phase, Mark's second postcondition indicates that any non-black object at the end of the mark phase retained its original color from the beginning of the mark phase.

For example, any leftover gray objects must have been gray at the beginning of the mark phase. Since no gray objects existed at the beginning, no gray objects exist at the end. Mark obeys the ban on black-to-white pointers by coloring an object black after its children are black. (Before coloring a node's children, Mark temporarily colors the node gray to indicate the node is "in progress"; without this intermediate step, a cycle in the graph would send Mark into an infinite loop.)

Quantifiers and Triggers

In the absence of universal and existential quantifiers, many theories are decidable and have practical decision procedures. These include the theory of arrays, the theory of linear arithmetic, the theory of un-interpreted functions, and the combination of these theories. Nonetheless, adding quantifiers makes the theories either un decidable or very slow to decide: the combination of linear arithmetic and arrays, for example, is un-decidable in the presence of quantifiers. Such forces verification to rely on heuristics for instantiating quantifiers. The choice of heuristics determines the success of the verification.

Many automated theorem provers, including Z3, use programmer-supplied triggers to guide quantifier instantiation. Consider again Sweep's precondition prohibiting gray objects. Below are two ways to write this in BoogiePL syntax, each with a different trigger:

```
forall  i:   :{memAddr(i) }memAddr(i)==>!Gray(Color[i]))   forall
i::{Color[i]} memAddr(i)==>!Gray(Color[i]))
```

Both have the same logical meaning, but use different instantiation strategies. The first asks i to be instantiated with expression e whenever an expression memAddr (e) appears during an attempt to prove a theorem. The second asks i to be instantiated with e whenever Color[e] appears. Selecting appropriate triggers is challenging in general. With an overly selective trigger, a quantified formula may never get instantiated, leaving a theorem unproved. With an overly liberal trigger, a quantified formula may be instantiated too often (even infinitely often), drowning the theorem prover in unwanted information.

One can also look at formulas of form for all i::{f(i)} f(i)==>P, using f(i) as a trigger. For example, one can employ memAddr(i) as a trigger, although this appears in so many places that it would be easy to accidentally introduce an infinite instantiation loop. (The appearance of memAddr(ptr) inside the Pointer function, which in turn appears in the Obj Inv function, which in turn appears in the GcInv function, is one example of such a loop.) To avoid accidental loops, one can introduce a function T (i:int), defined to be true for all i, solely for use as a trigger, writing the invariants above as:

```
For all i::{T(i)}T(i)==>memAddr(i)==>
    !Gray(Color[i]))
```

(Note that the ==> operator is right associative.) For conciseness, one can abbreviate for all i::{T(i)}T(i)==> as ∀ $^T$i. To avoid instantiation loops, one never write a formula of the form
∀ Ti.( ... T(e) ... ), where e is some expression other than a simple quantified variable.

Based on the trigger T (i), one can employ two strategies to ensure sufficient instantiation of quantified formulas. First, one can write explicit assertions of T (e) for various expressions e that appear in the program. Such helps Z3 prove formulas (∀ $^T$i.P(i))==>P(e). For example, the ReadField procedure explicitly asserts T(ptr) to instantiate the quantifiers in MutatorInv at the value ptr.

In a second approach, one can employ the trigger T (i) to prove formulas of the form (∀ $^T$i.P(i))==>(∀ $^T$j.Q(j)). In this case, since T appears in both quantifiers, Z3 automatically instantiates P at i=j to prove Q(j). In general, such second strategy is not sufficient for all P and Q; for example, knowing ∀ $^T$i.a[i+5]=0 does not prove ∀ $^T$j.a[j+6]=0, even though mathematically, these formulas are equivalent. Nevertheless, this strategy works well for purely local reasoning. For example, Sweep's loop invariant maintains the property ∀ $^T$i.memAddr(i)==>Gray(Color[i]). If the loop updates Color by changing Color [ptr] to 1 (white), then the theorem prover attempts to prove:

```
(memAddr(i)==> Gray (Color [i]))
==> (memAddr(i)==> Gray(Color' [i]))
``` where Color'=Color [ptr:=1]. In the case where i=ptr, Color [i]=Color'[i] and the proof is trivial. In the case where i=ptr, Gray(Color'[i])=Gray(1)=true. The proof is easy because the formula memAddr(i)==>Gray (Color [i]) is entirely local; it depends only on array elements at index i.

Many formulas depend on non-local array elements, though. Consider how Mark maintains this piece of the tricolor invariant (no black-to-white pointers) from GcInv in FIG. 4:

```
Black(Color[i])==>White(Color[Mem[i,0]])
```

This depends not only on i's color, but on the color of some other node Mem [i,0]. For non-local formulas, the local instantiation strategy suffices for some programs but not for others.

Regions

A mark-sweep collector appears easier to verify than a copying collector, because the mark-sweep collector does not modify pointers inside objects. As described above, the mark sweep collector in FIGS. 4-8 typically pass verification even with a very simple triggering strategy, while the analogous copying collector typically does not. Therefore, the discussion below augments the two strategies described earlier with a third instantiation strategy, based on regions. Together, such three strategies are typically sufficient for both mark-sweep and copying collectors.

In general, regions have proven useful for verifying the type safety of copying collectors, which suggests that they might also help verify the correctness of copying collectors. This suggests a strategy for importing regions (and the ease of verifying copying collectors via regions) from type systems: rather than defining just one concrete-to-abstract mapping $toAbs, allow multiple regions, where each region is an independent concrete-to-abstract mapping.

For example, considering object invariant uses in FIG. 4, wherein

```
$toAbs:
    ObjInv(i,$toAbs, $AbsMem,Mem) =
        $toAbs [i] = NO_ABS ==>
            Pointer($toAbs, Mem[i,0], $AbsMem[$toAbs[i],0]) ...
```

Expanding the Pointer function exposes a non-local invariant:

```
$toAbs [i] = NO_ABS ==>
    ... $toAbs[Mem[i,0]] = NO_ABS ...
```

As explained earlier, such ensures that no dangling pointers exist. The discussion below in part adopts a region-based object invariant:

```
ObjInv(i,$rs, $rt ,$toAbs, $AbsMem,Mem) =
    $rs [i] = NO_ABS ==>
        Pointer($rt, Mem[i,0], $AbsMem[$toAbs[i] ,0])
    ...
```

This object invariant describes an object living in a source region $rs, whose fields point to some target region $rt. Expanding the Pointer function yields:

```
$rs [i] = NO_ABS ==>
    ... $rt[Mem[i,0]] = NO_ABS ...
```

Now one can adopt another idea from region-based type systems: regions only grow over time, and are then deallocated all at once; deallocating a single object from a region is not allowed. In one aspect, such means that for any address j and region $r, $r [j] may change monotonically from NO_ABS to some particular abstract node, but thereafter $r [j] is fixed at that abstract node. The function RExtend expresses this restriction; the memory manager only changes $r to some new $r' if RExtend($r,$r') holds:

```
fun RExtend($r:[int] int,$r':[int]int) { (forall i: :{$r[i]} {$r' [i]}
    $r[i] = NO__ABS ==> $r[i] == $r'[i])
}
```

RExtend's quantifier is not based on T; instead, it can trigger on either $r [i] or $r' [i]. (Note that RExtend introduces no instantiation loops, because it only mentions r and r' at index i, and does not mention T at all.) Such can allow triggering of Z3 to prove formulas of the form ($\forall$ $^T$i.P(r[e]))==>($\forall$ $^T$i.P(r'[e])), where e depends on i. For example, given the guarantee that RExtend ($rt,$rt'), the object invariant ensures that if $rt [Mem [i,0]!=NO_ABS, then $rt'[Mem[i,0]!=NO_ABS.

Given this region-based object invariant, a memory manager can express all other invariants about node i as purely local invariants. For example, our region-based mark-sweep collector relates i's color to i's region state using purely local reasoning:

```
(White(Color[i]) ==>
    $r1 [i] = NO__ABS && $r2 [i] == NO__ABS
    && ObjInv(i, $r1, $r1, $toAbs, $AbsMem,Mem))
    && (Gray (Color [i]) ==>
    $r1 [i] = NO__ABS && $r2 [i] = NO__ABS && $r1 [i] == $r2 [i]
    && ObjInv(i,$r1, $r1, $toAbs, $AbsMem, Mem))
    && (Black(Color[i]) ==>
    $r1 [i] = NO__ABS && $r2 [i] = NO__ABS && $r2 [i] == $r2 [i]
    && ObjInv(i,$r2, $r2,$toAbs, $AbsMem,Mem))
```

If i is black, then Obj Inv (i, $r2, $r2, . . . ) ensures that i's fields point to members of region $r2. Members of $r2 cannot be white, since the invariant above forces white nodes to not be members of $r2. Thus, the invariant indirectly expresses the standard tri-color invariant (no black-to-white pointers), and the collector need not state the tri-color invariant directly.

One can briefly sketch the region lifetimes during a mark-sweep garbage collection. The collector's mark phase begins with $r1 equal to $toAbs and $r2 empty (i.e. $r2 maps all nodes to NO_ABS). At the beginning of the mark phase, all allocated objects are white, so the invariant above needs Obj-Inv(i,$r1,$r1, . . . ), and requires that no objects be members of $r2. As the mark phase marks each reached node i gray, it adds i to $r2, so that $r2 [i]!=NO_ABS. At the end of the mark phase, $r2 contains exactly the reached objects, while $r1 and $toAbs are the same as at the beginning of the mark phase. The sweep phase then removes unreached objects from $toAbs until $toAbs==$r2; Sweep leaves $r1 and $r2 unmodified. After sweeping, the mutator takes an action analogous to "deallocating" region $r1: it simply forgets about $r1, throwing out all invariants relating to $r1 and keeping only the invariants for $r2. In the next collection cycle, $r2 becomes the new $r1, and the process repeats.

Figure 9:
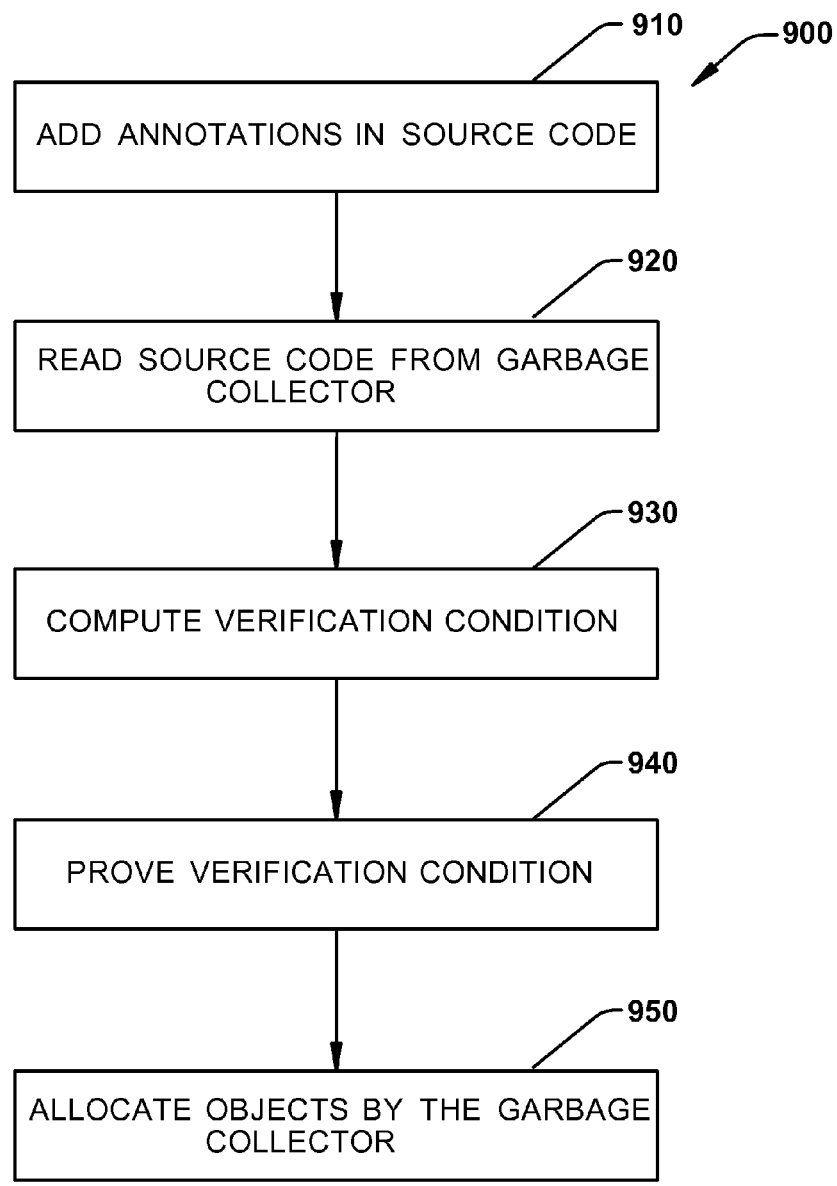
FIG. 9 illustrates a methodology of adding annotations to a source code in accordance with an aspect of the subject innovation.

FIG. 9 illustrates a methodology 900 of adding annotations to a source code in accordance with an aspect of the subject innovation. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described. Initially and at 910 annotations can be added in the source code to indicate what the source code is to do when it runs. Subsequently, and at 920 the program verifier can read the source code from the garbage collector. For each procedure, it will look at the specification of that procedure in addition to the logical formula associated therewith. At 930, a verification condition can then be computed, which represents a logical formula that if found to be validated indicates that the procedure updates the specification. Put differently, the source code can be read from the procedure and a verification condition can then be generated therefrom. Subsequently and at 940, the verification condition can then be proved, and hence the associated procedure verified. Similarly, once all the procedures are verified then the garbage collector is also verified. For example, if the garbage collector is thus verified for proper operation, the mutator can be run. Hence, the mutator can ask the garbage collector to allocate objects. The garbage collector can then decide to garbage collect memory.

As used in herein, the terms "component," "system", "module" and the like are intended to refer to a computer-related entity, either hardware, a combination of hardware and software, software or software in execution. For example, a component can be, but is not limited to being, a process running on a processor, a processor, an object, an instance, an executable, a thread of execution, a program and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance or illustration. Any aspect or design described herein as "exemplary" is not necessarily to be construed as preferred or advantageous over other aspects or designs. Similarly, examples are provided herein solely for purposes of clarity and understanding and are not meant to limit the subject innovation or portion thereof in any manner. It is to be appreciated that a myriad of additional or alternate examples could have been presented, but have been omitted for purposes of brevity.

Furthermore, all or portions of the subject innovation can be implemented as a system, method, apparatus, or article of manufacture using standard programming and/or engineering techniques to produce software, firmware, hardware or any combination thereof to control a computer to implement the disclosed innovation. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 10:
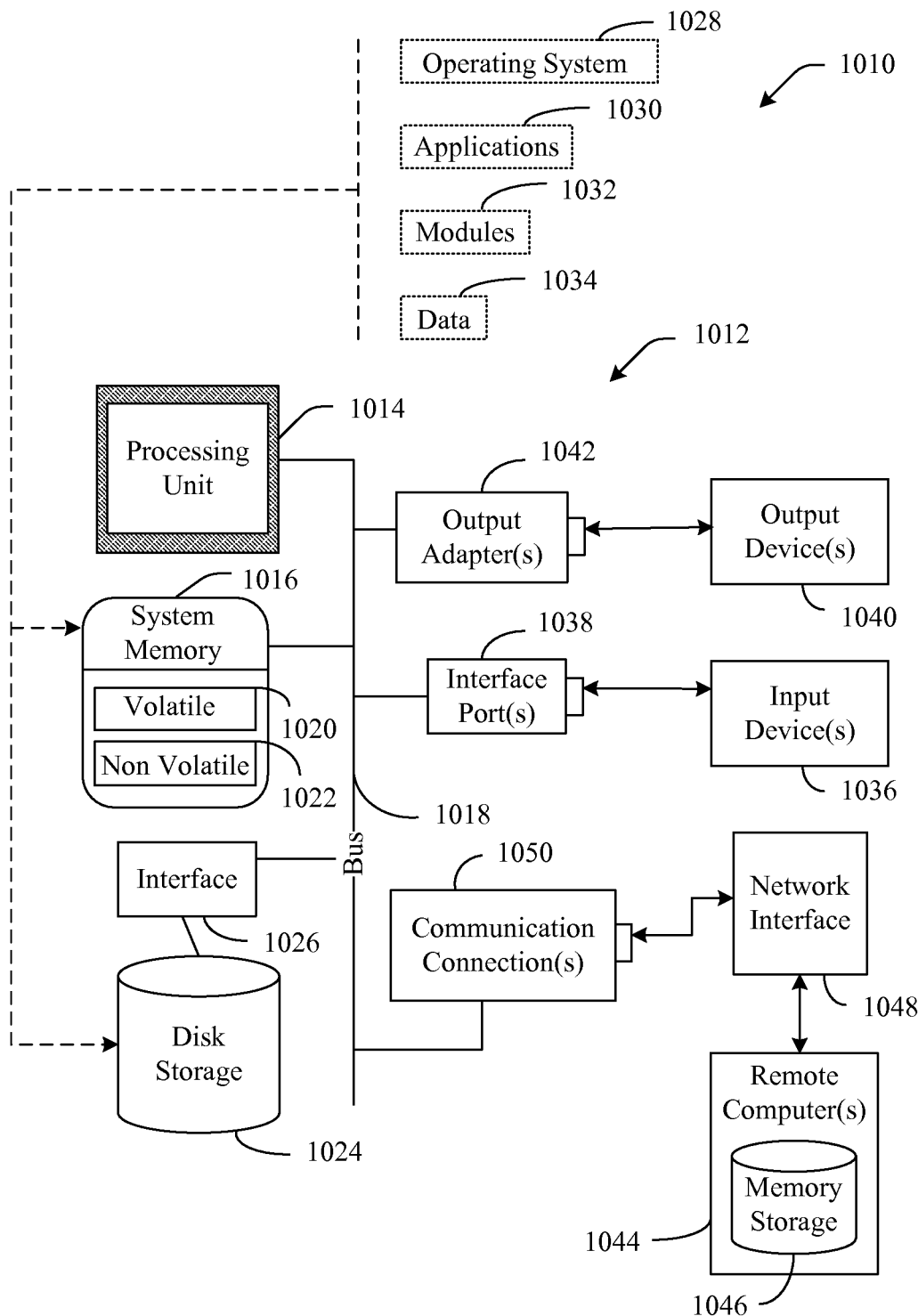
FIG. 10 illustrates an exemplary environment for implementing various aspects of the subject innovation.
Figure 11:
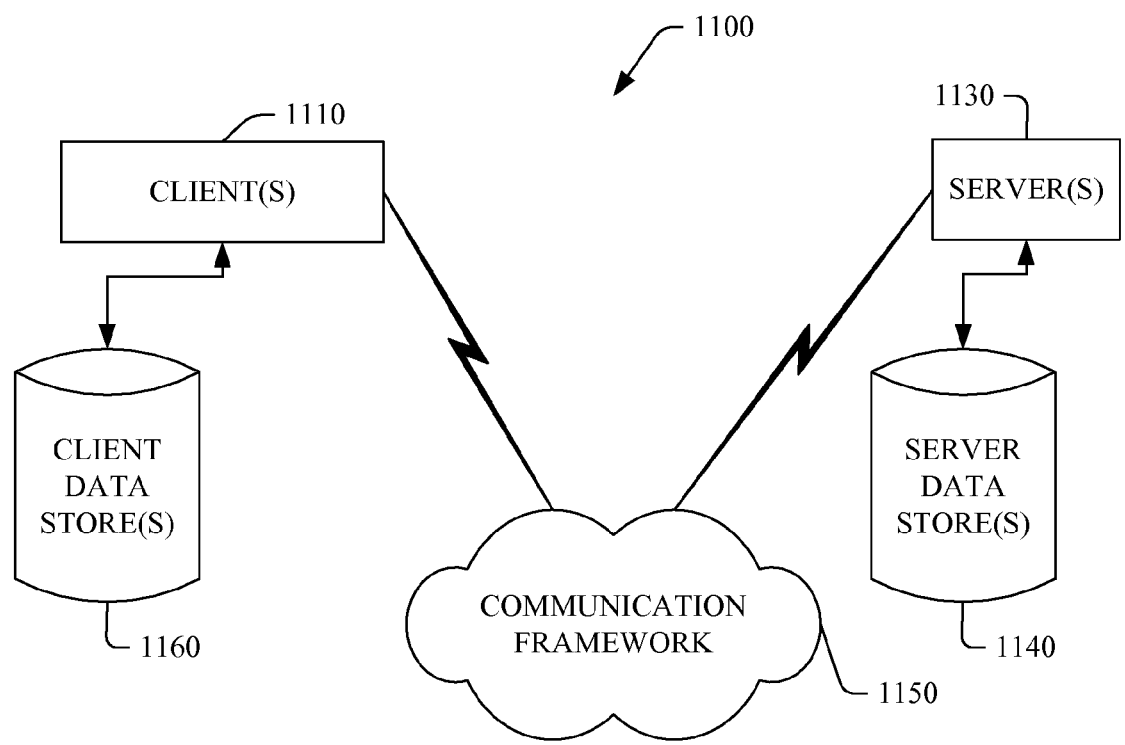
FIG. 11 illustrates a further exemplary environment for implementing various aspects of the subject innovation.

In order to provide a context for the various aspects of the disclosed subject matter, FIGS. 10 and 11 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the innovation also may be implemented in combination with other program modules. Generally, program modules include routines, programs, components, data structures, and the like, which perform particular tasks and/or implement particular abstract data types. Moreover, those skilled in the art will appreciate that the innovative methods can be practiced with other computer system configurations, including single-processor or multiprocessor computer systems, mini-computing devices, mainframe computers, as well as personal computers, handheld computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the innovation can be practiced on stand-alone computers. In a distributed computing environment, program modules may be located in both local and remote memory storage devices.

With reference to FIG. 10, an exemplary environment 1010 for implementing various aspects of the subject innovation is described that includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/non-removable, volatile/non-volatile computer storage media. FIG. 10 illustrates a disk storage 1024, wherein such disk storage 1024 includes, but is not limited to, devices like a magnetic disk drive, floppy disk drive, tape drive, Jaz drive, Zip drive, LS-60 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that various components described herein can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040 that require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

FIG. 11 is a schematic block diagram of a sample-computing environment 1100 that can be employed as part of adding specification to source code of the garbage collector in accordance with an aspect of the subject innovation. The system 1100 includes one or more client(s) 1110. The client(s) 1110 can be hardware and/or software (e.g., threads, processes, computing devices). The system 1100 also includes one or more server(s) 1130. The server(s) 1130 can also be hardware and/or software (e.g., threads, processes, computing devices). The servers 1130 can house threads to perform transformations by employing the components described herein, for example. One possible communication between a client 1110 and a server 1130 may be in the form of a data packet adapted to be transmitted between two or more computer processes. The system 1100 includes a communication framework 1150 that can be employed to facilitate communications between the client(s) 1110 and the server(s) 1130. The client(s) 1110 are operatively connected to one or more client data store(s) 1160 that can be employed to store information local to the client(s) 1110. Similarly, the server(s) 1130 are operatively connected to one or more server data store(s) 1140 that can be employed to store information local to the servers 1130.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims.

Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented method comprising the following computer executable acts:
    adding annotations via a specification in a source code of a garbage collector to indicate operation of the source during a run thereof;
    automatically generating verification conditions from each procedure of the source code based on the annotations; and
    automatically using a verification strategy based on regions for verifying the garbage collector by a verification component through the source code by automatically proving each verification condition without requiring the use of proof scripts.

2. The computer implemented method of claim 1 further comprising encoding regions by employing first order logic.

3. The computer implemented method of claim 1 further comprising proving statically that the garbage collector has predetermined properties.

4. The computer implemented method of claim 1 further comprising indicating for every concrete object that the garbage collector controls, a corresponding abstract object exists.

5. The computer implemented method of claim 1 further comprising computing a verification condition that represents a logical formula indicating a procedure obeying the specification.

6. The computer implemented method of claim 1 further comprising reading the source code from the garbage collector.

7. The computer implemented method of claim 1 further comprising asking a garbage collector to allocate objects.

8. The computer implemented method of claim 1 further comprising presenting occurrences in the garbage collector in a stylized manner.

9. The computer implemented method of claim 1 further comprising running a mutator to verify operation of the garbage collector.

10. A computer implemented system having a computer readable memory comprising the following computer executable components:
    a garbage collector that includes specifications presented as logical formulas processable via a theorem prover for indication of procedures associated with the garbage collector;
    a verification component that automatically verifies the garbage collector with respect to the specification; and
    wherein the verification component automatically generates verification conditions from each procedure and automatically proves each verification condition without requiring the use of proof scripts to automatically verify the garbage collector.

11. The computer implemented system of claim 10 further comprising a verification strategy based on regions.

12. The computer implemented system of claim 11 further comprising a standard first order logic theorem prover that automatically proves correctness of the garbage collector.

13. The computer implemented system of claim 11 further comprising a static verification of the garbage collector for predetermined properties.

14. The computer implemented system of claim 11, the specification indicates that for every object that the garbage collector controls, a corresponding abstract object exists that is allocated by a mutator.

15. The computer implemented system of claim 11 further comprising a memory manager that dynamically manages a memory heap.

16. The computer implemented system of claim 15 further comprising a stack decoder component that identifies roots within a memory stack.

17. The computer implemented system of claim 16 further comprising root identification storage locations.

18. A computer implemented system having a processor comprising:
    means for reading a source code from a garbage collector;
    means for adding annotations to the source code of the garbage collector;
    means for automatically generating verification conditions from each procedure of the source code based on the annotations; and
    means for automatically verifying the garbage collector by automatically proving each verification condition without requiring the use of proof scripts.

\* \* \* \* \*